US010880258B2

(12) United States Patent
Etchegoyen (10) Patent No.: US 10,880,258 B2
(45) Date of Patent: *Dec. 29, 2020

(54) LOCAL AREA SOCIAL NETWORKING

(71) Applicant: Uniloc 2017 LLC, Wilmington, DE (US)

(72) Inventor: Craig S. Etchegoyen, Newport Beach, CA (US)

(73) Assignee: UNILOC 2017 LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,988

(22) Filed: Apr. 27, 2020

(65) Prior Publication Data

US 2020/0259778 A1 Aug. 13, 2020

Related U.S. Application Data

(63) Continuation of application No. 13/657,859, filed on Oct. 22, 2012, now Pat. No. 10,637,820.

(60) Provisional application No. 61/550,314, filed on Oct. 21, 2011.

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 51/20* (2013.01); *H04L 51/04* (2013.01); *H04L 67/24* (2013.01)

(58) Field of Classification Search
CPC ......... H04L 51/32; H04L 51/20; H04L 51/04; H04L 67/24
See application file for complete search history.

(56) References Cited

U.S. PATENT DOCUMENTS

| | | | | |
|---|---|---|---|---|
| 2003/0182428 A1* | 9/2003 | Li | ........................ | H04L 67/1068 709/227 |
| 2006/0036766 A1* | 2/2006 | Baupin | .................... | H04L 12/18 709/245 |
| 2007/0079365 A1* | 4/2007 | Ito | ........................... | H04L 63/20 726/11 |
| 2007/0124689 A1* | 5/2007 | Weksel | ............. | H04M 3/53375 715/752 |
| 2007/0143408 A1* | 6/2007 | Daigle | ................ | H04L 63/0428 709/206 |
| 2008/0175235 A1* | 7/2008 | Frifeldt | .................... | H04M 7/12 370/389 |
| 2008/0235375 A1* | 9/2008 | Reynolds | ............ | G06F 16/9574 709/225 |

(Continued)

*Primary Examiner* — Hieu T Hoang
(74) *Attorney, Agent, or Firm* — Burdick Patents, P.A.; Sean D. Burdick (57) ABSTRACT

A local area social networking server limits social networking activity to people likely to be in close physical proximity to one another and likely to be engaged in similar activities, even people previously unknown to each other, by only permitting social networking between computing devices that are connected to one another through a common local area network. The server identifies recipient devices for a message that (i) are coupled to the same local area network as the sending device, (ii) are associated with demographic characteristics that match those specified for the message as intended recipients, and (iii) are indicated by receptivity data to be receptive to the message and the sender.

10 Claims, 5 Drawing Sheets

(56) References Cited

U.S. PATENT DOCUMENTS

2009/0075738 A1\* 3/2009 Pearce .................... G07F 17/32
 463/42
2013/0086179 A1\* 4/2013 Coleman ................ G06Q 10/10
 709/206

\* cited by examiner

LOCAL AREA SOCIAL NETWORKING

This application is a continuation of and claims priority to U.S. application Ser. No. 13/657,859 filed on Oct. 22, 2012 that claims priority to U.S. Provisional Application No. 61/550,314 filed on Oct. 21, 2011. Both of these applications are fully incorporated herein by reference.

BACKGROUND OF THE INVENTION

1. Field of the Invention

The present invention relates generally to network-based computer services and, more particularly, to methods of and systems for facilitating social networking through portable, personal, computing devices that are in relatively close physical proximity to one another.

2. Description of the Related Art

Social networking has taken hold in the 21st century as a ubiquitous form of communication throughout wide area networks such as the Internet. Many of the current social networking systems, however, provide little or no means to allow a subscriber to filter a list of contacts. An example of the absence of helpful filtering occurs in the familiar scenario wherein a subscriber has included hundreds or even thousands of "friends" within a given social networking system. Such systems are poorly equipped to allow a subscriber to establish a meaningful connection with any individual person through such a system without prior knowledge of a name or e-mail address.

There have been some attempts at filtering social networking activity by geographic location. Location-based filtration, however, raises serious privacy and perhaps safety concerns. No elegant solutions currently exist for filtering according to a meaningful activity in which subscribers engage.

What is needed is a more automated, secure, convenient, and less intrusive way of organizing social networking around people who are likely to have a particular shared interest associated with a physical location and a particular type of activity.

SUMMARY OF THE INVENTION

In accordance with the present invention, a local area social networking server limits social networking activity to people likely to be in close physical proximity to one another and likely to be engaged in similar activities, even people previously unknown to each other. Computing devices coupled to a common local area network are presumed to be in relatively close physical proximity to one another and to be associated with a common activity. Examples of the latter include a LAN in a convention hall in which those connected to the LAN can be presumed to share the common activity in participating in a convention.

To limit social networking to people likely to be in close physical proximity to one another and likely to be engaged in similar activities, the local area social networking server only permits social networking between computing devices that are connected to one another through a common local area network.

Computing devices interested in local area social networking check in with the server and provide the server information about the user of each computing device. Such information can include profile data that specifies one or more demographic characteristics of the user. In addition, the information received from each computing device identifies a particular local area network to which each computing device is connected. The information received from each computing device can also include receptivity data that specifies types of messages that can be received and types of people from whom messages can be received. The information can also include a digital fingerprint of each computing device to identify and recognize individual computing devices.

To send a message to people likely to be in close physical proximity to one another and likely to be engaged in similar activities, the user of a sending computing device composes a message and specifies one or more demographic characteristics of people to whom the message should be sent and sends the message to the server.

The server identifies one or more recipient computing devices that (i) are coupled to the same local area network as the sending computing device, (ii) are associated with demographic characteristics that match those specified for the message as intended recipients, and (iii) are indicated by receptivity data to be receptive to the message and the sender. The receptivity data can specify one or more demographic characteristics of senders from whom messages are to be accepted and one or more characteristics of messages that are to be accepted. The characteristics of the message specified in the receptivity data can include one or more demographic characteristics specified by the message as indicating to which people the message should be sent. For example, someone willing to accept business messages but no personal messages and indicate that he is only willing to accept messages which are addressed to people of his occupation or title or company affiliation.

The result is that individuals can precisely specify the types of social networking to which they are receptive and, since messages are limited geographically and to people likely to be currently engaged in similar activities, messages exchanged are likely to be highly relevant and highly timely to recipients.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, a local area social networking server 112 (FIG. 1) limits social networking activity to people likely to be in close physical proximity to one another and likely to be engaged in similar activities, even people previously unknown to each other. In particular, local area social networking server 112 only permits social networking between computing devices that are connected to one another through a common local area network (LAN).

Local area networks are typically managed by a single entity and, as their name suggests, only cover a local area. Accordingly, relatively close physical proximity can be safely assumed between multiple computing devices connected to one another through a common local area network. In addition, areas covered by a local area network are typically primarily intended to a single type of activity. A wireless router is one example of a LAN, which, due to its range, limits connectivity to computing devices that lie within an immediate area, i.e., within reception range of the router's broadcast signal.

For example, consider a LAN in a convention hall or large meeting room. Users of portable devices connected the LAN would very likely be engaged in a common activity such as a convention, a continuing education event, or a social network event. A LAN in a hotel presumably connects the same types of people connected in a convention hall as well as people who are traveling and might be interested in joining similarly situated people for a round of golf or some other activity. Even a residential LAN can be a useful venue for social networking between people who don't already know one another. While most occupants of a home can be presumed to know one another, guests who visit the home may be interested in local social networking as an unobtrusive means to learn more about their hosts and other guests. Such may be the case when a large party is hosted in a home.

Figure 1:
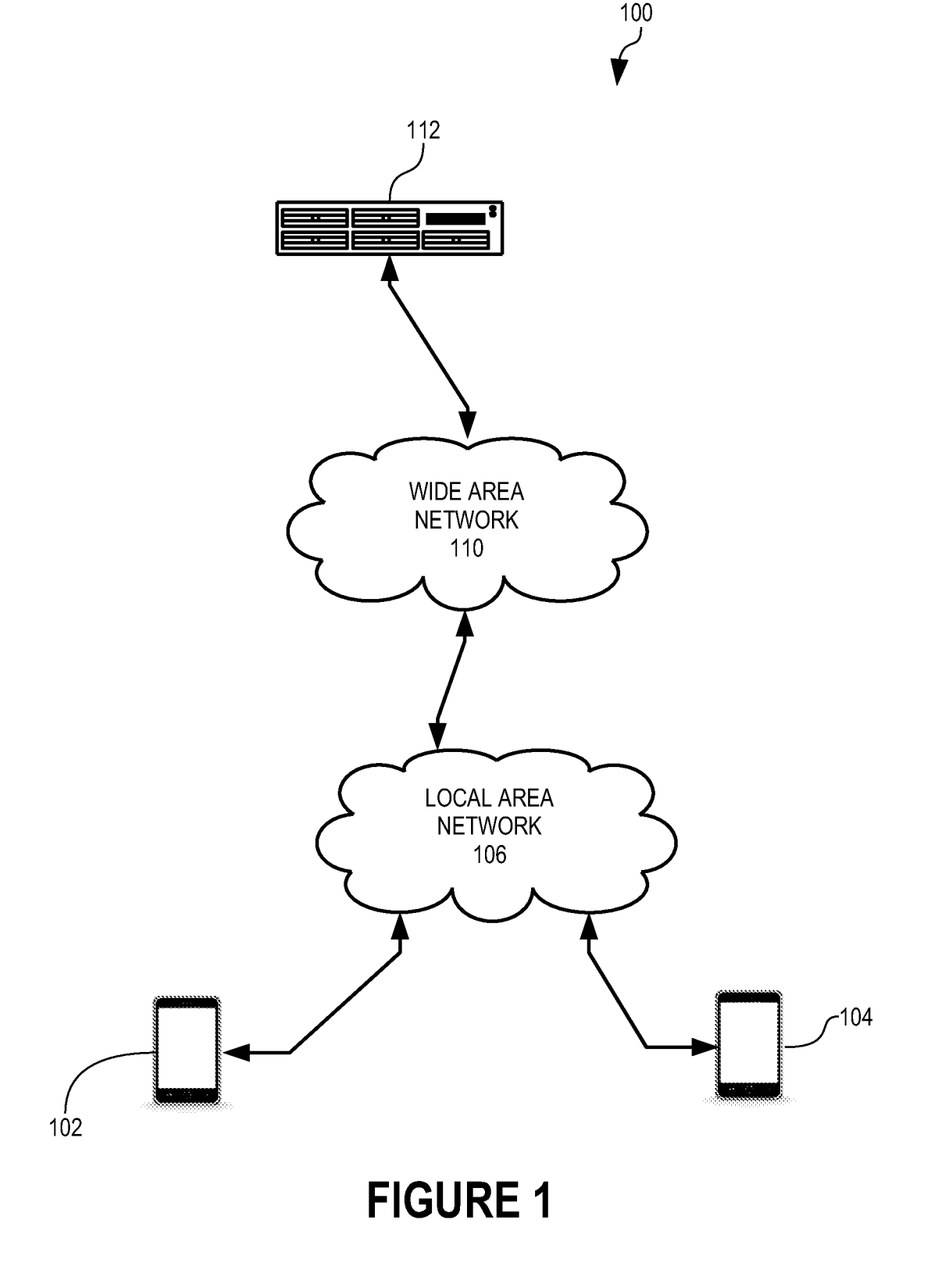
FIG. 1 is a diagram showing portable computing devices coupled to one another through a local area network and a local area social networking server computer that facilitate local area social networking between the portable computing devices in accordance with one embodiment of the present invention.

In FIG. 1, portable computing devices 102 and 104 are in communication with one another through a common LAN, e.g., LAN 106. Local area social networking server 112 is connected to portable computing devices 102 and 104, and can be connected to many other portable computing devices coupled to other LANs, through a wide area network 110, which is the Internet in this illustrative example. It should be appreciated that, while portable computing devices 102 and 104 are described herein to be portable and personal, local area social networking server 112 can facilitate local area social networking through non-portable computing devices as well.

Figure 2:
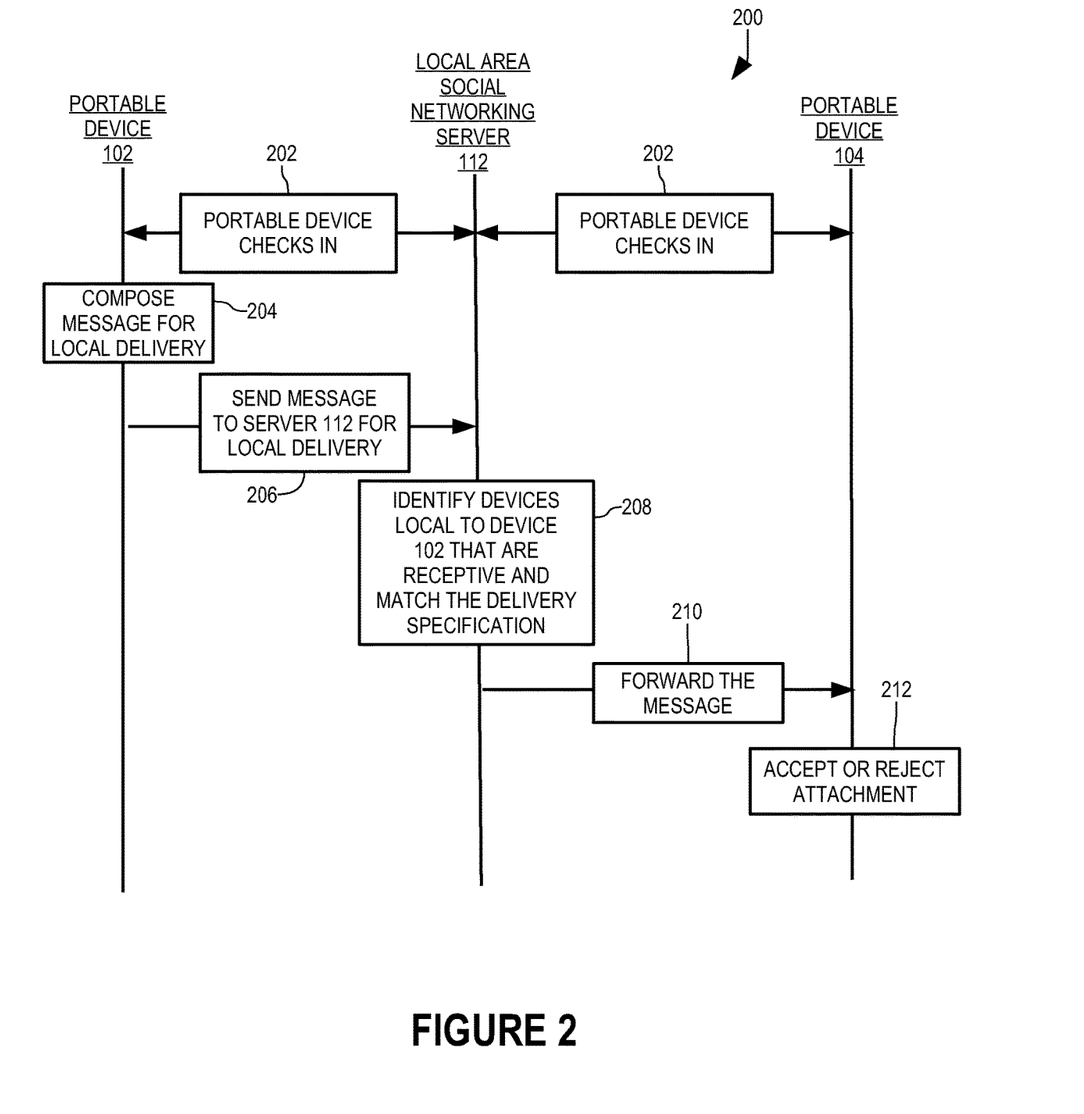
FIG. 2 is a transaction diagram illustrating one embodiment according to the invention of a method by which the local area social networking server computer of FIG. 1 facilitates local area social networking between the portable computing devices of FIG. 1.

Transaction flow diagram 200 (FIG. 2) illustrates the facilitation of local area social networking between portable devices 102 and 104 by local area social networking server 112. In separate, asynchronous performances of step 202, portable devices 102 and 104 check in with local area social networking server 112.

Checking in with local area social networking server 112 informs local area social networking server 112 of three primary types of information regarding a given portable computing device. These three types of information are illustrated in user data record 300 (FIG. 3), stored by local area social networking server 112 in portable device data 624 (FIG. 6), which is described more completely below.

Figure 3:
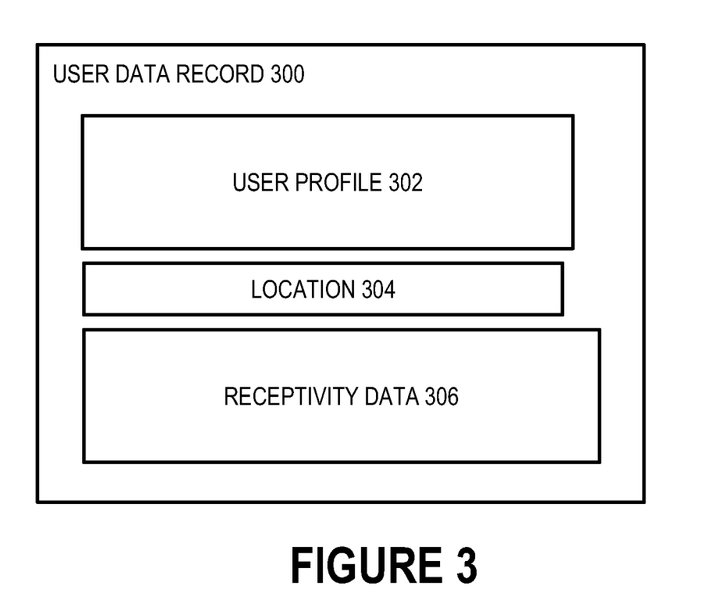
FIG. 3 is a block diagram of a user data record managed by a portable computing device of FIG. 1.

User data record 300 includes a user profile 302, a location 304, and receptivity data 306. User profile 302 contains demographic information about the person using a given portable computing device and is used by local area social networking server 112 to determine whether a given message should be delivered to this person. Such demographic information can be such things as gender, age, occupation, and interests. Personally identifiable information can also be included; however, in this illustrative embodiment, local area social networking server 112 protects anonymity of users of portable computing devices 102 and 104. However, local area social networking server 112 does not prevent such users from voluntarily waiving anonymity in this illustrative embodiment.

Location 304 identifies the LAN through which a given portable computing device communicates with local area social networking server 112. One way in which that particular LAN can be identified by local area social networking server 112 is described in commonly-owned and co-pending U.S. Patent Application 61/523,727 filed Aug. 15, 2011, and that description is incorporated herein by reference.

Receptivity data 306 specifies whether the person using the portable computing device from which the "check in" is received is receptive to messages from others in the same area and likely engaged in a similar activity. In addition, receptivity data 306 specifies in what ways the person is receptive. For example, the person can indicate that she is receptive to receiving messages but only when her occupation is specified as an intended audience in a message. In other words, a person can indicate that she is only interested in business-related messages. Or, the person can indicate that she is a registered attendee for a particular seminar being hosted at a particular location. Where the hosting location is a hotel that is hosting many seminars simultaneously, the receptivity data allows the local area social networking server 112 to target communications to the computing devices of intended recipients among a much larger pool of computing devices that may be logged on to the LAN.

In another embodiment, the person may limit receptivity data to exclude messages originating from any computing devices that have not registered a digital fingerprint with the local area social networking server 112, or have otherwise not attained a desired security clearance or trust level as defined and administered by the local area social networking server 112. Those skilled in the art will recognize that such receptivity data may be exploited according to the invention to advantageously target communications to a focused interest group in many other scenarios, whether for business purposes, leisure activities, secure communications, etc.

In another embodiment, the local area social networking server 112 may filter messages being sent according to receptivity data that has been received from a computing device at a point in time after the potential recipient's computing device has signed on to the local area network. Such receptivity data may be input by a user of a recipient computing device after connecting the recipient computing device to the local area social networking server through the local area network. This type of filtering may be beneficial, for example, when a user attends an event that advertises to its attendees a special set of receptivity data customized for matching up with specialized messages being broadcast at the event.

Local area social networking server 112 provides a user interface to portable computing devices 102 and 104 by which their respective users can (i) specify—or at least review and correct previously specified—demographic data and (ii) specify in what ways each user is receptive to messages from others.

After checking in by portable computing devices 102 and 104 in step 202 (FIG. 2), local area networking server 112 has information regarding the type of person using each of the portable computing devices, the location of each portable computing device, and data specifying the type of messages the respective users of portable computing devices 102 and 104 are receptive to receiving from others.

In step 204, the user of portable computing device 102 uses local area social networking logic 520—described more completely below—to compose a message for local delivery. Message 400 (FIG. 4) illustrates the basic categories of information specified by the user of portable computing device 102 and embodied in the composed message.

Figure 4:
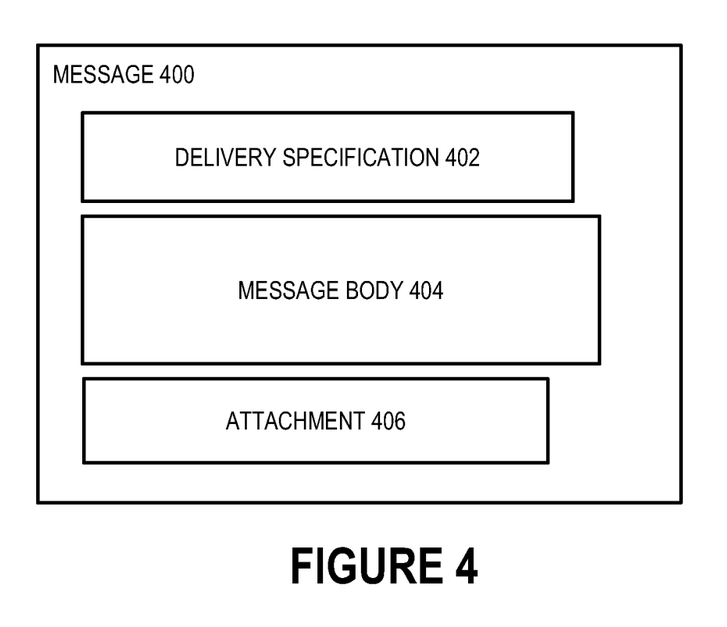
FIG. 4 is a block diagram of a social networking message passed between portable computing devices of FIG. 1.

Delivery specification 402 specifies the types of people for which message 400 is intended. To facilitate interaction between people who don't already know one another, delivery specification 402 specifies people by demographic properties, such as those included in user profile 302 (FIG. 3). For example, delivery specification 402 can specify that message 400 is to be delivered to people of a particular gender, age range, and occupation.

Message body 404 is the body, or content, of message 400. Attachment 406 is additional data to be included with message 400. Attachment 406 can be omitted, or multiple attachments can be included in message 400.

An example of a complete message is a message that (i) is intended for all Chief Executive Officers in a convention hall; (ii) includes an introductory message as message body 404, and (iii) includes a resume or C.V. as attachment 406.

In step 206 (FIG. 2), portable computing device 102 sends the composed message to local area social networking server 112 for local delivery. Portable computing device 102 sends the message in response to a command to do so from the user of portable computing device 102 through conventional user interface techniques.

In step 208, local area social networking server logic 620 (FIG. 6)—described below—of local area social networking server 112 identifies computing devices that are local to the sending portable computing device, i.e., portable computing device 102 (FIG. 2) in this illustrative example, and those that match delivery specification 402 (FIG. 4) and that are indicated, e.g., by receptivity data 306 (FIG. 3), to be receptive to the message.

Local area social networking server logic 620 identifies computing devices that are local to portable computing device 102 by identifying all computing devices that are checked in and have locations matching location 304 (FIG. 3) of the sending computing device.

Local area social networking server logic 620 identifies computing devices that match the delivery specification 402 of the message by comparing target demographic data specified in delivery specification 402 with demographic data in user profiles 302 of all locally checked in computing devices.

Receptivity data 306 can specify the types of messages to which a given user is receptive and the types of people from whom the given user is willing to receive messages. Accordingly, local area social networking server logic 620 compares receptivity data 306 of each locally checked in computing device associated with a user profile 102 that matches delivery specification 402 of the subject message with both (i) delivery specification 402 to ensure that the subject message is of the type to which the potential recipient user is receptive and (ii) user profile 102 of the sender of the subject message to ensure that the sender is someone from whom the potential recipient would be willing to receive messages.

In this illustrative embodiment, local area social networking logic 520 of portable computing device 104 provides the recipient user with an opportunity to accept or reject attachment 406 (FIG. 4) through conventional user interface techniques. For example, attachment 406 can be a v-card or other contact information of the user of the sending portable computing device and the user of portable computing device 104 can accept inclusion of the contact information of attachment 406 into contact information of portable computing device 104, thereby allowing the user of portable computing device 104 to directly contact the sending user.

It should be appreciated that the sending user is never made aware of any rejections by recipient users in this illustrative embodiment. Unless a recipient accepts an attachment or responds to a message, the sender is not informed as to whether a particular person received the message or was receptive or even was checked in with local area social networking server 112.

Figure 5:
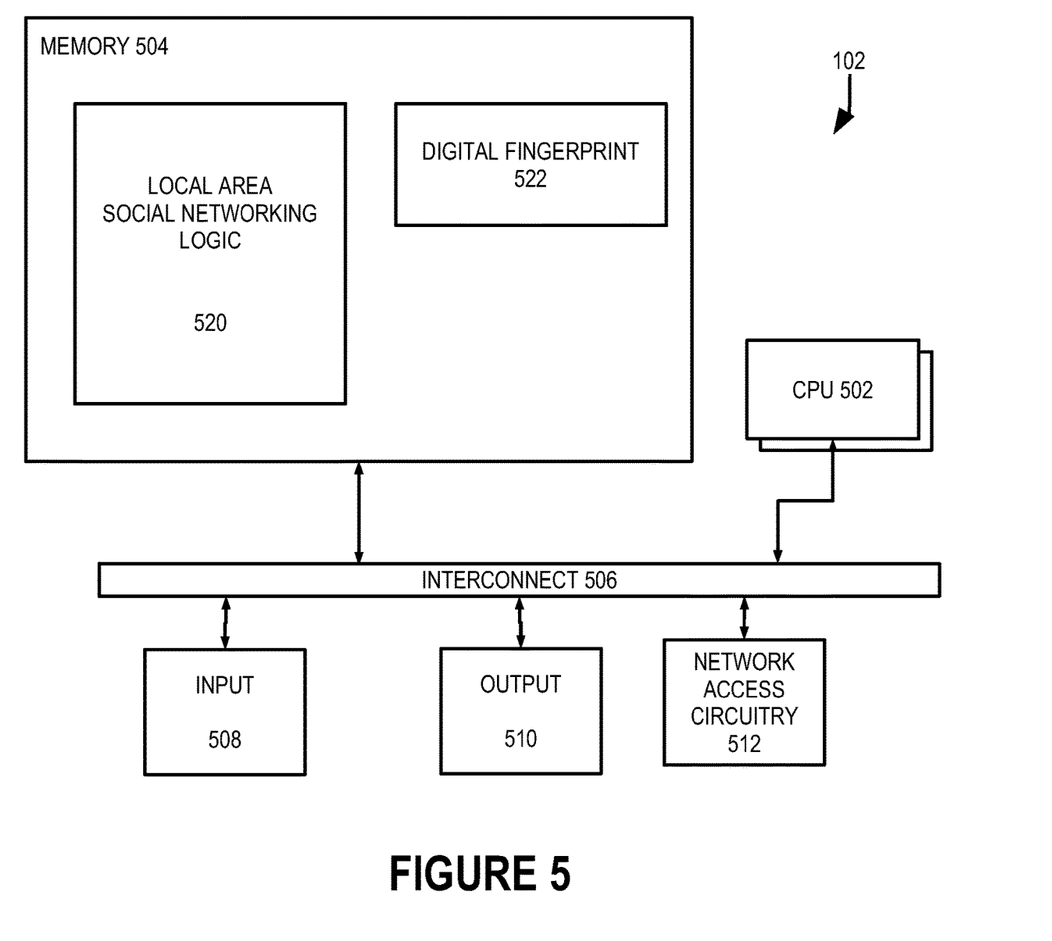
FIG. 5 is a block diagram showing a portable computing device of FIG. 1 in greater detail.

Portable computing device 102 may be a portable, personal, computing device such as a smart-phone or laptop computer and is shown in greater detail in FIG. 5. Portable computing device 102 includes one or more microprocessors 502 (collectively referred to as CPU 502) that retrieve data and/or instructions from memory 504 and execute retrieved instructions in a conventional manner. Memory 504 can include generally any computer-readable medium including, for example, persistent memory such as magnetic and/or optical disks, ROM, and PROM and volatile memory such as RAM.

CPU 502 and memory 504 are connected to one another through a conventional interconnect 506, which is a bus in this illustrative embodiment and which connects CPU 502 and memory 504 to one or more input devices 508, output devices 510, and network access circuitry 512. Input devices 508 can include, for example, a keyboard, a keypad, a touch-sensitive screen, a mouse, a microphone, and one or more cameras. Output devices 510 can include, for example, a display—such as a liquid crystal display (LCD)—and one or more loudspeakers. Network access circuitry 512 sends and receives data through computer networks such as local area network 106 (FIG. 1), the Internet, and mobile device data networks, for example.

A number of components of portable computing device 102 are stored in memory 504. In particular, local area social networking logic 520 is all or part of one or more computer processes executing within CPU 502 from memory 504 in this illustrative embodiment but can also be implemented using digital logic circuitry. As used herein, "logic" refers to (i) logic implemented as computer instructions and/or data within one or more computer processes and/or (ii) logic implemented in electronic circuitry.

Digital fingerprint 522 comprises data stored persistently in memory 504. Digital fingerprints are known and are described, e.g., in U.S. Pat. No. 5,490,216 (sometimes referred to herein as the '216 Patent), and in U.S. Patent Application Publications 2007/0143073, 2007/0126550, 2011/0093920, and 2011/0093701, the descriptions of which are fully incorporated herein by reference. In this illustrative embodiment, user profile 302 (FIG. 3) includes a digital fingerprint of an associated computing device to thereby uniquely identify and recognize individual computing devices. The inclusion of digital fingerprint 522 in the user profile provides a more secure means for preventing fraudulent use of the social networking server 112, and for establishing confidence in communications between people personally unknown to each other who may be connecting through the server 112 for the first time. For example, the server 112 may screen users connecting thereto by accessing a memory of stored digital fingerprints from devices that have previously registered with the server through a secure registration routine.

When executed in CPU 502 (FIG. 5) from memory 504, local area social networking logic 520 causes portable computing device 102 to behave in the manner described herein. Such behavior includes providing a user interface through which the user of portable computing device 102 composes messages and specifies receptivity through physical manipulation of input devices 508, thereby generating signals that represent message content and/or receptivity when interpreted by local area social networking logic 520.

Figure 6:
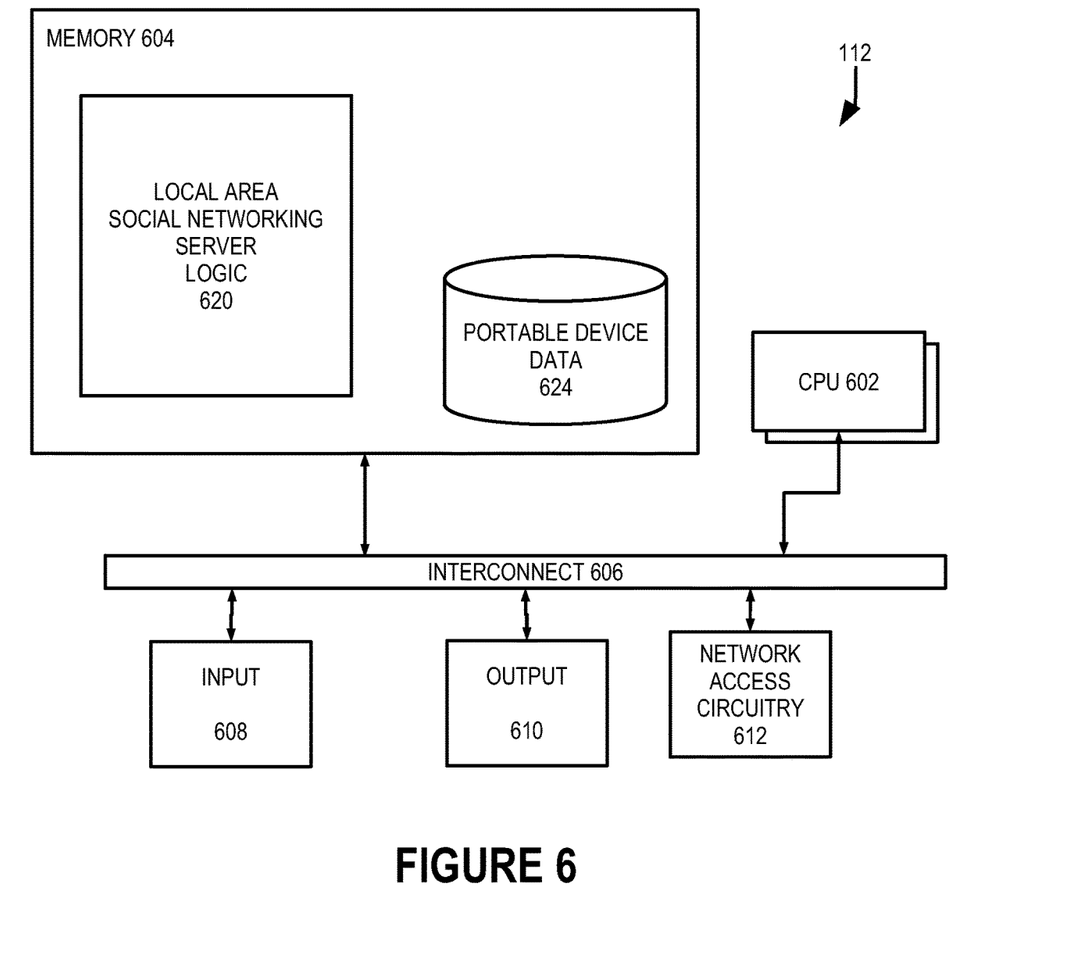
FIG. 6 is a block diagram showing the local area social networking server of FIG. 1 in greater detail.

Local area social networking server 112 is shown in greater detail in FIG. 6. Local area social networking server 112 includes one or more microprocessors 602 (collectively referred to as CPU 602), an interconnect 606, input devices 608, output devices 610, network access circuitry 612 that are directly analogous to CPU 502 (FIG. 5), an interconnect 506, input devices 508, output devices 510, network access circuitry 512, respectively. As local area social networking server 112 (FIG. 6) is a server computer, input devices 608 and output devices 610 can be omitted.

A number of components of local area social networking server 112 are stored in memory 604. In particular, local area social networking server logic 620 is all or part of one or more computer processes executing within CPU 602 from memory 604 in this illustrative embodiment but can also be implemented using digital logic circuitry. Portable device data 624 is data stored persistently in memory 604. Portable device data 624 includes user data records such as user data record 300 (FIG. 3) for at least all computing devices checked in with local area social networking server 112. In addition, portable device data 624 includes messages such as message 400 (FIG. 4) for at least all messages currently being processed by local area social networking server 112. In this illustrative embodiment, portable device data 624 is organized as one or more databases.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for facilitating a local area social network between two or more computing devices, the method comprising:
   receiving a message from a sending one of the computing devices through a local area network;
   identifying one or more recipient ones of the computing devices by:
      determining that the recipient computing devices are connected through the local area network,
      determining that the recipient computing devices are specified by a delivery specification of the message, and
      determining that the recipient computing devices have a determined desire to receive the message; and
   sending the message to the recipient computing devices;
   wherein determining that the recipient computing devices have a determined desire to receive the message comprises comparing one or more demographic characteristics received from the sending computing device to receptivity data received from each of the computing devices; and
   wherein the receptivity data received from each of the computing devices is input by a user of the computing device after connecting the computing device to the local area network.

2. A non-transitory computer readable medium useful in association with a computer which includes one or more processors and a memory, the computer readable medium including computer instructions which are configured to cause the computer, by execution of the computer instructions in the one or more processors from the memory, to facilitate a local area social network between two or more computing devices by at least:
   receiving a message from a sending one of the computing devices through a local area network;
   identifying one or more recipient ones of the computing devices by:
      determining that the recipient computing devices are connected through the local area network,
      determining that the recipient computing devices are specified by a delivery specification of the message, and
      determining that the recipient computing devices have a determined desire to receive the message; and
   sending the message to the recipient computing devices.

3. The non-transitory computer readable medium of claim 2 wherein the delivery specification of the message includes data specifying one or more demographic characteristics of people to whom the message should be sent; and
   further wherein determining that the recipient computing devices are specified by a delivery specification of the message comprises comparing the demographic characteristics specified in the delivery specification to one or more demographic characteristics received from each of the computing devices.

4. The non-transitory computer readable medium of claim 2 wherein determining that the recipient computing devices have a determined desire to receive the message comprises comparing the demographic characteristics specified in the delivery specification to receptivity data received from each of the computing devices.

5. The non-transitory computer readable medium of claim 2 wherein determining that the recipient computing devices have a determined desire to receive the message comprises comparing one or more demographic characteristics received from the sending computing device to receptivity data received from each of the computing devices.

6. The non-transitory computer readable medium of claim 5 wherein the receptivity data received from each of the computing devices is input by a user of the computing device after connecting the computing device to the local area network.

7. A computer system comprising:
   at least one processor;
   a computer readable medium that is operatively coupled to the processor;
   network access circuitry that is operatively coupled to the processor; and
   local area social networking server logic (i) that executes in the processor from the computer readable medium and (ii) that, when executed by the processor, causes the computer to facilitate a local area social network between two or more computing devices by at least:
- receiving a message from a sending one of the computing devices through a local area network;
- identifying one or more recipient ones of the computing devices by:
  - (i) determining that the recipient computing devices are connected through the local area network, (ii) determining that the recipient computing devices are specified by a delivery specification of the message, and (iii) determining that the recipient computing devices have a determined desire to receive the message; and
- sending the message to the recipient computing devices;

wherein the delivery specification of the message includes data specifying one or more demographic characteristics of people to whom the message should be sent; and further wherein determining that the recipient computing devices are specified by a delivery specification of the message comprises comparing the demographic characteristics specified in the delivery specification to one or more demographic characteristics received from each of the computing devices.

8. The computer system of claim 7 wherein determining that the recipient computing devices have a determined desire to receive the message comprises comparing the demographic characteristics specified in the delivery specification to receptivity data received from each of the computing devices.

9. The computer system of claim 7 wherein determining that the recipient computing devices have a determined desire to receive the message comprises comparing one or more demographic characteristics received from the sending computing device to receptivity data received from each of the computing devices.

10. The computer system of claim 9 wherein the receptivity data received from each of the computing devices is input by a user of the computing device after connecting the computing device to the local area network.

* * * * *